United States Patent

Higgins et al.

[11] Patent Number: 5,929,145
[45] Date of Patent: Jul. 27, 1999

[54] BITUMEN BACKED CARPET TILE

[75] Inventors: Kenneth Benjamin Higgins, LaGrange, Ga.; Thomas Earney Austin, Spartanburg, S.C.

[73] Assignee: Milliken & Company, Spartanburg, S.C.

[21] Appl. No.: 08/069,887

[22] Filed: Jun. 1, 1993

Related U.S. Application Data

[63] Continuation of application No. 07/660,296, Feb. 22, 1991, abandoned.

[51] Int. Cl.$^6$ ..................................................... C08L 31/00
[52] U.S. Cl. .................................. 524/69; 428/95; 428/96; 428/97
[58] Field of Search ................... 524/59, 68, 69, 524/425, 423, 437, 915

[56] References Cited

U.S. PATENT DOCUMENTS

| | | | |
|---|---|---|---|
| 3,753,938 | 8/1973 | Edwards et al. | 260/28.5 D |
| 3,887,422 | 6/1975 | Bosniack | 156/334 |
| 4,028,293 | 6/1977 | van den Berg | 260/28.5 AS |
| 4,191,799 | 3/1980 | Gruber | 428/96 |
| 4,201,812 | 5/1980 | Blanken et al. | 428/95 |
| 4,347,275 | 8/1982 | Kajikawa et al. | 428/95 |
| 4,582,554 | 4/1986 | Bell et al. | 156/247 |
| 4,702,950 | 10/1987 | Slosberg et al. | 428/95 |
| 4,975,476 | 12/1990 | Wolfe | 524/59 |
| 4,978,698 | 12/1990 | Woodhams | 524/62 |
| 5,047,462 | 9/1991 | Kehr et al. | 524/423 |
| 5,360,849 | 11/1994 | Braga et al. | 524/68 |
| 5,366,779 | 11/1994 | Thompson | 428/96 |

FOREIGN PATENT DOCUMENTS

| | | | |
|---|---|---|---|
| 309674 A2 | 4/1989 | European Pat. Off. | |
| 58-31170 | of 0000 | Japan | A47G 27/02 |
| 0091743 | 5/1983 | Japan | 524/59 |
| A-62-275 160 | 11/1987 | Japan | |
| A-2-084 465 | 3/1990 | Japan | |
| 5-7522 | 1/1993 | Japan | A47G 27/02 |
| 2 219 802 | 12/1989 | United Kingdom | |

*Primary Examiner*—Paul R. Michl
*Attorney, Agent, or Firm*—Terry T. Moyer; Timothy J. Monahan

[57] ABSTRACT

A bitumen composition suitable for a carpet tile backing is provided having from 12 to 35 wt. % bitumen, from 50 to 85 wt. % of an inorganic filler such as calcium carbonate and from 0.5 to 20 wt. % of an acid functionalized polyolefin selected from acrylic acid, maleic acid and maleic anhydride grafted isotactic polypropylene. The cold flow characteristics of the composition can be improved by incorporating from 1 to 10 wt. % atactic polypropylene.

30 Claims, No Drawings

5,929,145

BITUMEN BACKED CARPET TILE

This is a continuation application of patent application Ser. No. 07/660,296, filed Feb. 22, 1991, now abandoned, for BITUMEN BACKED CARPET TILE. Specific reference is being made herein to obtain the benefit of its earlier filing date.

BACKGROUND OF THE INVENTION

1. Field of the Invention

The present invention relates to a bitumen composition having improved resistance to deformation under load and decreased tackiness. The bitumen composition is particularly useful as a backing for carpet tile.

2. Description of the Prior Art

Carpet tiles have been conventionally manufactured by coating the back surface of a carpet material having a fibrous wear surface with one or more coatings of a heavy duty carpet backing composition. Such carpet backing compositions, all of which in general have been known for years, include amorphous polyolefins, bitumens, polyvinyl chloride and polyurethane blends. Because of its relatively low cost and ready availability bitumen is an attractive potential primary component for carpet backing compositions. Bitumen, however, has suffered from several deficiencies that have made it unsuitable for use in high quality carpet tile products. Firstly, bitumen backed carpet tiles have suffered from inadequate resiliency. Under high load conditions, e.g., under the legs of chairs or tables or when exposed to foot traffic that includes high heel shoes, permanent indentations or other damage may occur that will have a negative effect on the "lay" or dimensional stability of the sectional carpet tile. The reason for this is plastic deformation of the backing composition under the influence of the load. This phenomenon is known as "cold flow". The use of polyolefin additives to stiffen the backing composition and decrease cold flow has not met with success in the prior art, due in part to incompatability between the polyolefin and bitumen leading to phase separation.

Another disadvantage of bitumen backed carpet tiles is the undesired tackiness of the exposed back surface of the tiles. This disadvantage is most troublesome during shipment of the tiles when they are generally stacked, one top of the other, so that the wear or top surface comes into contact with the exposed bituminous backing layer causing some bitumen to stick to the top surface of the tile underneath it and thereby ruin the tile even before it is installed. Typically, in order to overcome this deficiency, it has been thought to be necessary to provide on the back of the carpet tile a secondary backing sheet as disclosed, for instance, in U.S. Pat. No. 4,702,950 (see Column 4, lines 30 to 41). The use of such backing sheet, however, increases the cost of the carpet-tile product thereby eliminating or obviating the cost advantage of a bituminous backing system and does little or nothing to enhance the performance of the carpet tile in actual use. In fact, the presence of such an additional layer in the carpet tile may offer the opportunity for product failure during use due to delamination.

Carpet backing compositions composed predominantly of amorphous polyolefins are described in European Patent No. 309,674, published Apr. 5, 1989. The patent also discloses the use of polyolefins which have been reacted with unsaturated acid or acid anhydrides in the backing composition.

SUMMARY OF THE INVENTION

It would, therefore, be desirable to provide a bituminous carpet backing composition that obviates or overcomes the disadvantages associated with conventional bitumen-backed carpet tiles while at the same time taking full advantage of the economic and performance advantages known to be associated with the use of such materials in the manufacture of carpet tiles.

Accordingly, the present invention relates to a carpet tile comprising a fibrous wear surface adhered to a backing layer comprised of bitumen, filler and a polyolefin polymer that has been partially or entirely reacted with an organic unsaturated acid or an organic unsaturated acid anhydride.

DETAILED DESCRIPTION OF THE INVENTION

As used herein, the term "bitumen" is defined to include both bitumen and modified bitumens, such as blown bitumen, which include for example, compounds having properties of from about 5 to about 200 needle point penetration, preferably from about 100 to about 175 needle point penetration and a ring and ball softening point ranging from about 100° F. to about 300° F., preferably from about 130° F. to about 170° F. The bitumen is preferably unblown and may comprise the primary organic constituent of the backing composition, e.g., from about 12 to about 35 percent, preferably from about 15 to about 25 percent.

The backing composition also includes a filler material, preferably a substantial amount of filler material in an amount ranging from about 20% to about 85% by weight, more typically from about 50% to about 85% by weight, preferably from 60% to 80% by weight. Typical fillers include inorganic particles of powdered limestone (calcium carbonate), magnesium carbonate, magnesium sulfate, aluminum hydrate, barium sulfate and glass. The particle size of the filler may range from an average distribution of about 5 to about 192 microns, preferably from about 10 to 150 microns. Examples of suitable commercial supplies of calcium carbonate are the Jura White filler grade G.GR.ALP. of the Ulm Limestone Mill and the 92 white from Filler Products. Alternatively, the filler may be an inorganic fiber such as glass fibers having an average length of $\frac{1}{1000}$ inch to $\frac{1}{16}$ inch. The filler is present in the backing composition during the time the composition is in a melted state and prior to casting the composition onto a sheet. Therefore, it is desirable that the filler be sufficiently fine to remain suspended in the melt during normal process steps such as temporary storage and transfer in pipes at 325° F. to 400° F. Additionally, to avoid high viscosities which increase the difficulty of processing the components, one should select a filler having an intermediate average particle size.

A mixture of bitumen and filler alone does not have sufficient cold flow stability to be useful as a carpet tile backing. In order to decrease cold flow and increase the viscosity and softening point of the composition, an acid functionalized polyolefin polymer is added in the range of 0.5 to 20 weight %, preferably 0.5 to 10 weight % and most preferably 1.0 to 8 weight %. While greater then 20% of the polymer may be employed in the composition, it is undesirable from a cost standpoint and, for most applications, results in an overly stiff product.

The acid functionalized polyolefin polymer is predominantly a polymer, copolymer or terpolymer of ethylene, propylene and butylene, incorporating unsaturated organic acid or acid anhydride monomers which produces a polymer having pendant acid or acid anhydride groups. The polymer is at least 80 weight % polyolefin and from 0.2 to 20 weight % acid monomers, preferably from 0.5 to 10 weight % acid monomers. Examples of useful acid monomers include acrylic acid, methacrylic acid, maleic acid, monoalkyl maleates, fumaric acid, monoalkyl fumarates, aconitic acid and maleic anhydride.

It is believed that the pendant acid and acid anhydride groups form bonds with the filler particles to stabilize the backing composition. The acid value of the polymer should be at least 2 mg KOH/g, preferably 40 to 60 mg KOH/g (in the case of anhydrides, this value is determined after prior ring opening with water). In practicing the invention, it has not been found necessary to add water to the composition to open the anhydride ring since traces of moisture present on the surface of the filler are generally sufficient to accomplish this goal.

According to one embodiment, the polyolefin polymer is a predominantly crystalline polypropylene, preferably isotactic polypropylene, that has been functionalized by reaction with organic acids containing double bonds or a corresponding acid anhydride in a suitable manner. Polymers that can be used include, for example, polypropylenes grafted with acrylic acid, methacrylic acid, or fumaric acid. This class of compounds includes, for instance, the Polybond grades distributed by BP Performance Polymers, Inc. Hackettstown, N.J., especially grades containing 6% grafted acid or acid anhydride. Other examples include polypropylenes grafted with maleic anhydride which include polymers distributed by Himont under the brand name Hercoprime and distributed by Eastman under the brand name Epoleen. In addition to polypropylene, it is also possible to use propylene-ethylene copolymers, propene-1-butene copolymers, 1-butene-ethylene copolymers, a mixture of polypropylene and the latter copolymers or polybutylene as the polyolefin backbone.

In general the graft copolymers described herein are produced by the conventional methods of graft polymerization of the unsaturated acids or anhydrides in the presence of the graft substrate and a radical forming substance. Such radical forming substances include peroxides, azo compounds, and high energy radiation. Typical synthesis examples are described in European Patent Number 188926, Belgian Patent Number 692301, Japanese Patent Number 27,421/66, and U.S. Pat. No. 3,499,819. Processing viscosities for practical applications are obtained with compositions having a melt index value of 10 g/10 minutes or higher.

According to another embodiment of the present invention, the polyolefin polymer may be an essentially amorphous polyolefin that has been functionalized essentially as described above, that is by radical grafting of the amorphous polyolefin with maleic anhydride or fumaric acid. Especially suitable amorphous polyolefins include the propene-butane-ethane terpolymers of Huls AG available commercially under the brand name Vestoplast, e.g., in accordance with German Patent Number 2930108. Synthesis of such graft copolymers is accomplished in solution or in a melt in the presence of peroxides, corresponding examples are described, for example, in German Patent OLS 1546982, East German Patent Number 20232, AL 2632869, and in the *Journal of Applied Polymer Science,* Vol. 13, pages 1625ff (1969).

It should be noted that degradation of the backbone polymer often takes place in the course of radical grafting. In particular, this degradation can have noticeable negative effects when tertiary carbons are present in the polymer chain because experience has shown that cold flow and thus the depth of penetration after a load increase with a decrease in molecular weight. However, the positive effect achieved by introducing carboxyl groups far outweighs the negative effect of peroxide degradation of the polymer which is associated with grafting.

Amorphous polyolefins containing polybutadiene may also be used. German Patent Number AL 2708757 describes the effects of polybutadiene which increases the degree of grafting during the grafting reaction. When using this grafting aid, partial crosslinking of the polymer also takes place at the same time. When using starting polymers that contain double bonds (e.g., propene-ethane-1,5-hexadiene terpolymer) the addition of peroxides is unnecessary because grafting can then take place on a purely thermal basis in the manner of an "ene" reaction (see for example German Patent OL 2,401,149 or U.S. Pat. No. 3,260,708). When grafting in a melt, the version according to U.S. Pat. No. 3,862,265 yields advantages in extruder processing. As an alternative however, it is also possible to work with the batch process in a mixing vessel.

Any monomer that is not covalently bonded and is present during the reaction (e.g., maleic anhydride) does not have a negative influence on the mechanical properties of the bituminous backing composition, but in order to prevent an odor problem it should be reacted with long chain alcohols or amines to form the corresponding hemiester or amide.

The melt viscosity of the amorphous graft copolymer at 375° F. is in the range of from about 300 to 60,000 cps, preferably 1,000 to 20,000 cps. In general, the bituminous backing composition that can be processed well at the desired filler content of, say, from about 60 to about 75 weight percent based upon the total of the weight of the backing composition can be obtained when the bitumen-olefin polymer component has a melt viscosity of 5,000 to a maximum of 100,000 cps at 375° F.

Although graft polymerization is the best known method of introducing acid or acid anhydride functionalities on the polyolefin substrate, it is not intended that the scope of the invention be limited only to polyolefins modified my graft polymerization. For example, other techniques such as copolymerization of an olefin with an unsaturated acid or unsaturated acid anhydride may be employed. Unless otherwise limited herein, the term acid functionalized polyolefin polymer is intended to include polymers having a backbone of predominantly polyolefins with pendant acid or acid anhydride groups.

The performance characteristics of the backing composition, especially with regard to brittleness, may be improved by adding up to 20 weight % of an amorphous polyolefin selected from polymers, copolymers and terpolymers of ethylene, propylene and butylene. The amorphous polyolefin decreases brittleness while increasing the stiffness and viscosity of the composition. In a preferred embodiment, from 1 to 10 weight % of the amorphous polyolefin is added. Atactic polypropylene is the preferred polyolefin.

In a preferred embodiment, the ratio of bitumen, filler, acid functionalized polyolefin polymer and amorphous polymer is balanced to optimize both stability, measured by softening point, needle penetration and cold flow, and flexibility. In particular, it is desirable that needle penetration, cold flow and flex be as low as possible. Compositions having a softening point above 300 F. are preferred.

There are a number of minor additives generally known to those with skill in the art which may be added to the backing composition. These minor additives include: an antioxidant such as Irganox 3114, a tri(3,5-di-t-butyl 4-hydroxybenzyl) iso-cyanurate manufactured by Ciba-Geigy Corp.; a heat stabilizer such as DSTSP, a distearyl 3,3'-thiodipropionate, manufactured by Humko Chemical Co.; and a lubricant such as steric acid to promote the flow of the composition through processing equipment. The minor additives are typically used in concentrations of less than one weight % each in the backing composition, preferably in ranges of 0.1 to 0.3 weight % each.

In general, the bituminous backing compositions containing the filler are prepared in mixing vessels by first melting the bitumen and then mixing it at a temperature of about 390° F. with the polyolefin polymer until a homogenous mixture is formed. Viscosity regulators are added as desired to the bitumen prior to mixing with the polyolefin polymer. The filler is incorporated last.

Test Procedures

The performance of various backing compositions was evaluated by a range of tests including: melt viscosity, ring and ball softening, flexibility, needle penetration, filler content, elastic modulus, shrinkage and cold flow. For those tests requiring films of the backing composition, films were prepared by casting the composition on an 8"×8"×0.050" thick template and an 8"×8"×0.100" thick template at 400° F.

Melt Viscosity

Viscosities were measured at 375° F. on a Brookfield RVTD viscometer with Thermosel heater system, using a No. 27 spindle. After allowing the temperatures of the spindle and samples to stabilize at 375° F., five readings were taken and averaged.

Ring and Ball Softening Point

A standard ring and ball support apparatus, Humbolt Model H-1569, was placed in an 800 milliliter beaker containing 550 milliliters of glycerine. The beaker was placed on a Fisher Thermix Model 118 hot plate which uniformly increased the temperature of the glycerine and testing apparatus. The softening point of the backing composition was measured at the temperature at which the ball fell through the hot melt.

Needle Penetration

A standard needle penetration apparatus, Precision Scientific 73510, with a 50 g weight was used to determine needle penetration by placing the sample in a cup and lowering the needle until it just touched the surface of the sample. The needle was released and, after 5 seconds, reclamped. Penetration was read in tenths of a millimeter from the dial.

Filler Content By Ashing

The sample was weighed into a tared crucible and placed in a muffle furnace at 700° F. for 10 minutes. The crucible was cooled and the filler remaining was calculated.

Flexibility

A Mandrel bending tester, Model 266, was used to determine the flexibility of a 1"×4" strip of sample film that was prepared as described above. The thickness of the film was measured and recorded. Following the instructions provided with the tester, flexibility was measured as the smallest diameter bar around which the film could be bent without showing cracks.

Elastic Modulus

A Wallace Test Equipment, Model L5, torsion tester was used to determine the elastic modulus on one-quarter inch wide, die cut strips of sample film prepared as described above. The thickness of each film was measured and recorded. Block dyes were used to press holes in the sample and trim it to the correct length. Sample was clamped to the torque pulley and lowered into a 25° C. water bath and allowed to equilibrate for five minutes. Next, the torque pulley was released and after five seconds the angle was read and recorded. Two more samples of each film were prepared and tested as above.

Elastic modules was calculated according to the following formula:

$$E = 82.147 \text{(weight on the torque pulley)} \div \text{(thickness)}^3 \text{ (u) (angle)}$$

wherein u is read from Appendix III of the Torsion Tester Instruction Manual. An average elastic modulus is calculated for each composition tested.

Shrinkage

A 6"×6" film prepared as described above was measured, heated to 250° F. for one hour, allowed to cool to ambient temperature and measured again. The first and second measurements were compared and the % shrikage was calculated.

Cold Flow

An air cylinder with a "foot", measuring 1 square centimeter in area, is attached to a dial which is able to detect downward movement of the foot relative to the cylinder. A 1"×1"×0.100 thick specimen of the backing is placed under the foot and the dial is zeroed. Air pressure is applied to the cylinder to give a force of 17 kg/cm$^2$ on the foot. Pressure is maintained for 4 hours at ambient temperature and the degree of penetration is measured as a percentage of the thickness of the specimen.

The invention may be further understood by reference to the following examples, which are not to be construed as limiting the subject matter of the present invention, which is defined in the claims appended hereto. Unless otherwise indicated, all parts and percentages are by weight percent.

EXAMPLE 1

A sample backing composition was prepared having the following composition and performance characteristics:

|  | A. | |
| --- | --- | --- |
| Bitumen[1] | 27.0% | |
| Filler[2] | 72.4% | |
| Misc. additives[5] | 0.6% | |
|  | 100.0% | |
| Softening point, °F. | 160 | low |
| Needle penetration, 1/10 mm | 17 | |
| Cold flow, % | 82 | high |
| Viscosity (cps @ 375° F.) | 4,000 | |
| Flex (mm bar) | 2 | |
| Modulus, lb/in$^2$ | 1,000 | |

[1]150° F. softening point, 120 needle penetration bitumen.
[2]CaCO$_3$ with average particle size of 21 microns.
[3]0.3% steric acid, 0.2% DSTDP, 0.1% Irganox 3114.

The sample was insufficiently stable to be useful as a backing composition. In particular, the softening point was low and the cold flow was unacceptably high.

EXAMPLE 2

A group of samples were prepared incorporating 1,4,10 and 15% of an acid functionalized polyolefin polymer in the composition. In each case, the criteria of primary importance with regard to stability, softening point, needle penetration and cold flow showed improvement.

|  | B | C | D | E |
|---|---|---|---|---|
| Bitumen[1] | 26.7 | 25.9 | 24.3 | 23.0 |
| Filler[2] | 71.7 | 69.5 | 65.1 | 61.4 |
| Functionalized Polymer[3] | 1.0 | 4.0 | 10.1 | 15.0 |
| Misc. additive[5] | 0.6 | 0.6 | 0.6 | 0.6 |
|  | 100.0 | 100.0 | 100.0 | 100.0 |
| Softening point, °F. | 264 | 320 | 324 | 324 |
| Needle penetration, 1/10 mm | 19.5 | 10 | 2 | 1.5 |
| Cold flow, % | 66 | 11 | 6.5 | 5.5 |
| Viscosity (cps @ 375° F.) | 2500 | 23,000 | 143,000 | 245,000 |
| Flex (mm bar) | 4 | 32 | 32+ | 32+ |
| Modulus, lb/in$^2$ | 900 | 22,000 | 54,000 | 93,500 |

[1]150° F. softening point, 120 needle penetration bitumen.
[2]CaCO$_3$ with average particle size of 21 microns.
[3]Polybond 1001, 6% acrylic acid grafted, isotactic polypropylene.
[5]0.3% steric acid, 0.2% DSTDP, 0.1% Irganox 3114.

EXAMPLE 3

A sample was prepared incorporating an amorphous polyolefin into the composition in Sample C of Example 2. Cold flow was significantly improved and viscosity increased.

|  | F. |
|---|---|
| Bitumen[1] | 20.0 |
| Filler[2] | 72.4 |
| Functionalized Polymer[3] | 4.0 |
| Amorphous polyolefin[4] | 3.0 |
| Misc. additive[5] | 0.6 |
|  | 100.0 |
| Softening point, °F. | 319 |
| Needle penetration, 1/10 mm | 3.5 |
| Cold flow, % | 4 |
| Viscosity (cps @ 375° F.) | >200,000 |
| Flex (mm bar) | 32+ |
| Modulus, lb/in$^2$ | 38,000 |

[1]150° F. softening point, 120 needle penetration bitumen.
[2]CaCO$_3$ with average particle size of 21 microns.
[3]Polybond 1001, 6% acrylic acid grafted, isotactic polypropylene.
[4]Atactic polypropylene.
[5]0.3% steric acid, 0.2% DSTDP, 0.1% Irganox 3114.

EXAMPLE 4

A sample was prepared in which a bitumen having a needle penetration of 20–30 was substituted for the bitumen used in Sample F of Example 3. The sample had good softening point, needle penetration and cold flow characteristics, although it was less flexible.

|  | G. |
|---|---|
| Bitumen[1] | 20.0 |
| Filler[2] | 72.4 |
| Functionalized Polymer[3] | 4.0 |
| Amorphous polyolefin[4] | 3.0 |
| Misc. additive[5] | 0.6 |
|  | 100.0 |
| Softening point, °F. | 320 |
| Needle penetration, 1/10 mm | 1.5 |
| Cold flow, % | 9 |
| Viscosity (cps @ 375° F.) | 210,000 |
| Flex (mm bar) | 32+ |
| Modulus, lb/in$^2$ | (Brittle) |

[1]150° F. softening point, 20/30 needle penetration bitumen.
[2]CaCO$_3$ with average particle size of 21 microns.
[3]Polybond 1001, 6% acrylic acid grafted, isotactic polypropylene.
[4]Atactic polypropylene.
[5]0.3% steric acid, 0.2% DSTDP, 0.1% Irganox 3114.

EXAMPLE 5

Samples were prepared varying the concentration of the acid functionalized polyolefin polymer and amorphous polyolefin to optimize both stability characteristics, i.e., softening point, needle penetration and cold flow, and flexibility.

|  | H. | I. |
|---|---|---|
| Bitumen[1] | 20.0 | 20.0 |
| Filler[2] | 72.4 | 72.4 |
| Functionalized Polymer[3] | 3.0 | 2.0 |
| Amorphous polyolefin[4] | 4.0 | 5.0 |
| Misc. additive[5] | 0.6 | 0.6 |
|  | 100.0 | 100.0 |
| Softening point, °F. | 318 | 315 |
| Needle penetration, 1/10 mm | 4.8 | 5.9 |
| Cold flow, % | 9 | 8.5 |
| Viscosity (cps @ 375° F.) | 116,000 | 84,000 |
| Flex (mm bar) | 19 | 16 |
| Modulus, lb/in$^2$ | 12,500 | 9,000 |

[1]150° F. softening point, 120 needle penetration bitumen.
[2]CaCO$_3$ with average particle size of 21 microns.
[3]Polybond 1001, 6% acrylic acid grafted, isotactic polypropylene.
[4]Atactic polypropylene.
[5]0.3% steric acid, 0.2% DSTDP, 0.1% Irganox 3114.

EXAMPLE 6

A sample was prepared substituting BaSO$_4$ filler for the CaCO$_3$ filler of Sample H of Example 5. The sample showed good stability and flexibility.

|  | J. |
|---|---|
| Bitumen[1] | 20.0 |
| Filler[2] | 72.4 |
| Functionalized Polymer[3] | 3.0 |
| Amorphous polyolefin[4] | 4.0 |
| Misc. additive[5] | 0.6 |
|  | 100.0 |
| Softening point, °F. | 318 |
| Needle penetration, 1/10 mm | 6 |
| Cold flow, % | 9 |
| Viscosity (cps @ 375° F.) | 43,500 |
| Flex (mm bar) | 16 |
| Modulus, lb/in$^2$ | 9,000 |

[1]150° F. softening point, 120 needle penetration bitumen.
[2]BaSO$_4$ with average particle size of 10 microns.
[3]Polybond 1001, 6% acrylic acid grafted, isotactic polypropylene.
[4]Atactic polypropylene.
[5]0.3% steric acid, 0.2% DSTDP, 0.1% Irganox 3114.

EXAMPLE 7

A sample was prepared substituting a maleic anhydride grafted polypropylene for the acid functionalized polyolefin polymer of Sample H of Example 5. The sample showed good stability and flexibility.

| K. | |
|---|---|
| Bitumen[1] | 20.0 |
| Filler[2] | 72.4 |
| Functionalized Polymer[3] | 3.0 |
| Amorphous polyolefin[4] | 4.0 |
| Misc. additive[5] | 0.6 |
| | 100.0 |
| Softening point, °F. | 305 |
| Needle penetration, 1/10 mm | 6 |
| Cold flow, % | 15.5 |
| Viscosity (cps @ 375° F.) | 8,000 |
| Flex (mm bar) | 12 |
| Modulus, lb/in$^2$ | 7,000 |

[1]150° F. softening point, 120 needle penetration bitumen.
[2]CaCO$_3$ with average particle size of 21 microns.
[3]Epoleen E-43, a 0.5 wt. % maleic anhydride grafted isotactic polypropylene.
[4]Atactic polypropylene.
[5]0.3% steric acid, 0.2% DSTDP, 0.1% Irganox 3114.

EXAMPLE 8

A sample was prepared replacing the acid functionalized polyolefin polymer of Sample I of Example 5 with bitumen. The sample had marginal stability indicating that even 2% of the functionalized polymer improves the softening point, needle penetration and cold flow characteristics of the composition.

| L. | |
|---|---|
| Bitumen[1] | 22.0 |
| Filler[2] | 72.4 |
| Amorphous polyolefin[4] | 5.0 |
| Misc. additive[5] | 0.6 |
| | 100.0 |
| Softening point, °F. | 280 |
| Needle penetration, 1/10 mm | 9 |
| Cold flow, % | 33 |
| Viscosity (cps @ 375° F.) | 63,000 |
| Flex (mm bar) | 32+ |
| Modulus, lb/in$^2$ | 14,500 |

[1]150° F. softening point, 120 needle penetration bitumen.
[2]CaCO$_3$ with average particle size of 21 microns.
[4]Atactic polypropylene.
[5]0.3% steric acid, 0.2% DSTDP 0.1% Irganox 3114.

EXAMPLE 9

A sample was prepared using blown bitumen rather than unblown bitumen. A plasticizer was also added to improve the handleability of the composition. The sample showed good stability, especially with regard to cold flow.

| | |
|---|---|
| Bitumen[1] | 12.0 |
| Filler[2] | 72.4 |
| Functionalized Polymer[3] | 4.0 |
| Amorphous polyolefin[4] | 6.0 |
| Plasticizer[6] | 5.0 |
| Misc. additive[5] | 0.6 |
| | 100.0 |
| Softening point, °F. | 312 |
| Needle penetration, 1/10 mm | 1.9 |
| Cold flow, % | 8.0 |
| Viscosity (cps @ 375° F.) | 62,000 |
| Flex (mm bar) | 20 |
| Modulus, lb/in$^2$ | 25,000 |

[1]225° F. softening point, 15 needle penetration, blown bitumen.
[2]CaCO$_3$ with average particle size of 21 microns.
[3]Polybond 1001, 6% acrylic acid grafted, isotactic polypropylene.
[4]Atactic polypropylene.
[5]0.3% steric acid, 0.2% DSTDP, 0.1% Irganox 3114.
[6]C-5 polyolefin plasticizer to lower viscosity.

EXAMPLE 10

A sample was prepared incorporating a mixture of acrylic acid grafted and maleic anhydride grafted functionalized polymers into the composition of Sample F. The sample showed good stability and flexibility.

| | |
|---|---|
| Bitumen[1] | 20.0 |
| Filler[2] | 72.4 |
| Functionalized Polymer[3] | 4.0 |
| Amorphous polyolefin[4] | 3.0 |
| Misc. additive[5] | 0.6 |
| | 100.0 |
| Softening point,°F. | 312 |
| Needle penetration, 1/10 mm | 5 |
| Cold flow, % | 9 |
| Viscosity (cps @ 375° F.) | 65,500 |
| Flex (mm bar) | 25 |
| Modulus, lb/in$^2$ | 14,900 |

[1]150° F. softening point, 120 needle penetration bitumen.
[2]CaCO$_3$ with average particle size of 21 microns.
[3]One part Polybond 1001, 6% acrylic acid grafted, isotactic polypropylene and three parts Epoleen E-43, a 0.5 wt. % maleic anhydride grafted isotactic polypropylene.
[4]Atactic polypropylene.
[5]0.3% steric acid, 0.2% DSTDP, 0.1% Irganox 3114.

A comparison of traditional bituminous backing compositions and the present bituminous compositions shows that by providing the appropriate amount of acid functionalized polyolefin polymer in the backing composition endurance under load, that is, penetration under load may be significantly improved. Permanent deformation or depth of penetration is much lower due to this improved resiliency. Other advantages associated with use of the carpet backing compositions as described above in connection with carpet tile products include reduced shrinkage, improved installation behavior of the carpet tiles as well as reduced tackiness of the tiles making it possible to eliminate the fibrous backing layer otherwise necessary to prevent rubbing off of the bituminous backing onto the top surface of other tiles during storage.

The carpet tiles of the present invention may further include in the carpet backing portion of the tile one or two sheets of stabilizing sheet material such as glass fiber material, e.g., glass tissue or scrim and may also contain a secondary backing sheet on the back surface of the carpet tile although, as mentioned above, such backing sheets may not be necessary because of the reduced tackiness of the bituminous backing composition.

The method of preparing the carpet tile products of the present invention comprises the steps casting a layer of bituminous carpet backing composition as described above onto a releasable sheet material. The thickness of this layer should be such as to provide in the carpet tile product a total weight contributed by this layer of from about 40 to about 70 ounces per square yard of the bituminous backing composition. Then a woven or non-woven fibrous sheet such as a tissue or scrim layer of for instance glass fiber tissue or other material may be laid onto that cast sheet. Thereafter a second or "tie coat" layer of the bituminous composition is applied in the molten phase in an amount typically to result in the weight contribution of this layer being from about 25 to about 40 ounces per square yard or such that the total amount of bituminous composition backing material will range in the final product from about 65 to about 110, preferably from about 75 to about 85 ounces per square yard.

The intermediate or tie coat layer may be adhered to the back of the fibrous wear surface by any of a wide variety of techniques that will be quite familiar to those skilled in this particular art. Thus, for instance, the back of the fibrous wear surface may be impressed into the tie coat layer while it is in the molten phase to achieve a unitary product or alternatively the tie coat layer may be allowed to cool and the backing may be stored for future use. When it is thereafter desired to bond the backing layer to the back of the fibrous wear surface an additional thin layer of molten bituminous composition may be applied to the top of the tie coat layer and thereafter the back of the fibrous wear surface may be brought into contact with the molten material to achieve a unitary product. Such product may be subsequently cut into desired carpet tile size and then packaged.

It is to be understood that the invention is not limited to any particular method for formation of the fibrous wear surface. Thus, for instance, the fibrous wear surface may be made by tufting techniques, bonding techniques, or it may even be a non-woven needle punch material. All of these constructions will in general be well known to those skilled in this particular art.

There are, of course, many alternate embodiments and modifications which are intended to be included within the scope of the following claims.

What we claim is:

1. A bitumen composition comprising:
   12 to 35 weight % of bitumen having a ring and ball softening point ranging from 100° F. to 200° F. and a needle point penetration of from 20 to 200;
   0.5 to 20 weight % of an acid functionalized polyolefin polymer, said polymer comprising at least 80 weight % olefin monomers selected from ethylene, propylene and butylene, and from 0.2 to 20 weight % acid monomers selected from organic, unsaturated carboxylic acids and carboxylic acid anhydrides, wherein said polymer has a plurality of pendant acid or acid anhydride groups; and
   50 to 85 weight % of a finely divided, inorganic filler capable of bonding to said pendant acid or acid anhydride groups, wherein said filler is characterized by an average particle size greater than 5 microns.

2. A composition according to claim 1 wherein said acid functionalized polyolefin polymer is prepared by grafting said acid monomers to a polyolefin backbone of said olefin monomers and said acid monomers comprise from 0.5 to 10 weight % of said polymer.

3. A composition according to claim 2 wherein said acid monomers are selected from acrylic acid, maleic acid and maleic anhydride, and said polyolefin backbone is polypropylene.

4. A composition according to claim 1 wherein said polymer comprises from 0.5 to 10 weight % of said composition.

5. A composition according to claim 4 wherein said polymer is prepared by grafting said acid monomers to a polyolefin backbone of said olefin monomers.

6. A composition according to claim 5 wherein said acid monomers are selected from acrylic acid, maleic acid and maleic anhydride and said polymer has an acid value of at least 10 mg KOH/g.

7. A composition according to claim 6 wherein said polyolefin backbone is isotactic polypropylene.

8. A backing composition according to claim 5 wherein said filler comprises from 60 to 80 weight % of said composition, and said filler is selected from calcium carbonate, magnesium carbonate, magnesium sulfate, aluminum hydrate, barium sulfate and glass particles having an average particle size ranging from 5 to 192 microns and glass fibers having an average length of from 1/1000 inch to 1/16 inch.

9. A composition according to claim 1 wherein said bitumen is unblown and comprises from 15 to 25 weight % of said composition, has a ring and ball softening point ranging from 130° F. to 170° F. and a needle point penetration of from 100 to 175.

10. A composition according to claim 9 wherein said polymer is prepared by grafting said acid monomers to a polyolefin backbone of said olefin monomers, said acid monomers are selected from acrylic acid, maleic acid and maleic anhydride, and further wherein said polymer comprises from 1.0 to 8 weight % of said composition.

11. A composition according to claim 9 wherein said polymer is prepared by grafting said acid monomers to a polyolefin backbone of said olefin monomers and said polymer comprises from 0.5 to 10 weight % of said composition.

12. A composition according to claim 11 wherein said polyolefin backbone is polypropylene.

13. A composition according to claim 1 further comprising from 0.5 to 20 weight % of an amorphous polyolefin selected from polymers, copolymers and terpolymers of ethylene, propylene and butylene.

14. A composition according to claim 13 wherein said amorphous polyolefin comprises from 1 to 10 weight % of said composition.

15. A composition according to claim 14 wherein said acid functionalized polyolefin polymer is prepared by grafting said acid monomers to a polyolefin backbone of said olefin monomers and said polymer comprises from 1.0 to 8 weight % of said composition.

16. A composition according to claim 15 wherein said acid monomers are selected from acrylic acid, maleic acid and maleic anhydride, said polyolefin backbone is isotactic polypropylene and said amorphous polyolefin is atactic polypropylene.

17. A composition according to claim 16 wherein said bitumen has a ring and ball softening point ranging from 130° F. to 170° F. and a needle point penetration of from 100 to 175, and said bitumen comprises from 15 to 25 weight % of said composition.

18. A composition according to claim 17 wherein said filler is calcium carbonate having an average particle size of 24 to 150 microns.

19. A backing composition for a carpet tile, comprising:
    15 to 25 weight % of an unblown bitumen having a ring and ball softening point ranging from 130° F. to 170° F. and a needle point penetration of from 100 to 175;
    0.5 to 20 weight % of an acid functionalized polyolefin polymer, said polymer having a polyolefin backbone selected from polymers, copolymers and terpolymers of ethylene, propylene and butylene, and a plurality of pendant organic acid or acid anhydride groups formed by grafting acid monomers selected from acrylic acid, maleic acid and maleic anhydride to said polyolefin backbone; and
    60 to 85 weight % of an inorganic filler selected from calcium carbonate, magnesium carbonate, magnesium sulfate, aluminum hydrate, barium sulfate and glass particles having an average particle size ranging from 5 to 192 microns and glass fibers having an average length of from 1/1000 inch to 1/16 inch.

20. A composition according to claim 19 wherein said polymer comprises from 2.0 to 10 weight % of said composition.

21. A composition according to claim 20 wherein said polymer has an acid value of at least 10 mg KOH/g.

22. A composition according to claim 20 further comprising from 0.5 to 20 weight % of an amorphous polyolefin selected from polymers, copolymers and terpolymers of ethylene, propylene and butylene.

23. A composition according to claim 20 wherein said acid monomers comprise from 0.5 to 10 weight % of said polymer.

24. A composition according to claim 23 wherein said polyolefin backbone is polypropylene.

25. A composition according to claim 24 further comprising from 1 to 10 weight % of an amorphous polyolefin selected from polymers, copolymers and terpolymers of ethylene, propylene and butylene.

26. A composition according to claim 25 wherein said acid functionalized polyolefin polymer is isotactic polypropylene and said amorphous polyolefin is atactic polypropylene.

27. A composition according to claim 26 wherein said filler is calcium carbonate having an average particle size from 10 to 150 microns.

28. In a unitary carpet tile having a fibrous wear surface and a layer of a bituminous backing composition, wherein the backing composition comprises:

15 to 25 weight % of an unblown bitumen having a ring and ball softening point ranging from 130° F. to 170° F. and a needle point penetration of from 100 to 175;

1.0 to 8 weight % of an acid functionalized polyolefin polymer, said polymer having a polyolefin backbone selected from polymers, copolymers and terpolymers of ethylene, propylene and butylene, and a plurality of pendant acid or acid anhydride groups formed by grafting from 0.2 to 10 weight %, based on a total weight of said polymer, of an unsaturated, carboxylic acid or carboxylic acid anhydride monomer to said polyolefin backbone; and 60 to 80 weight % of an inorganic filler selected from calcium carbonate, magnesium carbonate, magnesium sulfate, aluminum hydrate, barium sulfate and glass particles having an average particle size ranging from 5 to 192 microns and glass fibers having an average length of from 1/1000 inch to 1/16 inch.

29. A backing composition according to claim 28 wherein said pendant acid and acid anhydride groups are capable of bonding to said filler at the melting point of said backing composition.

30. A backing composition according to claim 28 further comprising from 0.5 to 10 weight % of an amorphous polyolefin selected from polymers, copolymers and terpolymers of ethylene, propylene and butylene.

* * * * *